(12) United States Patent
Chen et al.

(10) Patent No.: US 10,894,354 B2
(45) Date of Patent: Jan. 19, 2021

(54) SLA ADDITIVE MANUFACTURING USING FROZEN SUPPORTS OF NON-SLA MATERIAL

(71) Applicant: University of Southern California, Los Angeles, CA (US)

(72) Inventors: Yong Chen, Los Angeles, CA (US); Jie Jin, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 315 days.

(21) Appl. No.: 15/870,628

(22) Filed: Jan. 12, 2018

(65) Prior Publication Data

US 2018/0200947 A1 Jul. 19, 2018

Related U.S. Application Data

(60) Provisional application No. 62/446,092, filed on Jan. 13, 2017.

(51) Int. Cl.

| | |
|---|---|
| *B29C 64/124* | (2017.01) |
| *B29C 64/40* | (2017.01) |
| *B29C 64/295* | (2017.01) |
| *B29C 64/357* | (2017.01) |
| *B33Y 10/00* | (2015.01) |
| *B29C 64/245* | (2017.01) |
| *B29C 64/205* | (2017.01) |
| *B33Y 30/00* | (2015.01) |
| *B33Y 70/00* | (2020.01) |
| *B29C 64/268* | (2017.01) |
| *B29C 35/16* | (2006.01) |

(52) U.S. Cl.
CPC ............ *B29C 64/124* (2017.08); *B29C 35/16* (2013.01); *B29C 64/205* (2017.08); *B29C 64/245* (2017.08); *B29C 64/268* (2017.08); *B29C 64/295* (2017.08); *B29C 64/357* (2017.08); *B29C 64/40* (2017.08); *B33Y 10/00* (2014.12); *B33Y 30/00* (2014.12); *B33Y 70/00* (2014.12); *B29C 2035/1616* (2013.01)

(58) Field of Classification Search
CPC .................................................... B29C 64/124
See application file for complete search history.

(56) References Cited

U.S. PATENT DOCUMENTS

2003/0083771 A1* 5/2003 Schmidt ................. B33Y 30/00
700/119

* cited by examiner

*Primary Examiner* — Larry W Thrower
(74) *Attorney, Agent, or Firm* — Snell & Wilmer LLP

(57) ABSTRACT

Methods and apparatuses for additive manufacturing using stereolithography ("SLA") materials. The apparatus includes a platform for holding an assembly of SLA resin layers. The apparatus also includes a platform for holding an assembly of SLA resin layers. The apparatus also includes a first movable stage for depositing and curing a portion of the liquid SLA resin on the platform, forming a pattern of cured SLA resin. The apparatus also includes a second movable stage for depositing a low-viscosity non-SLA material in voids in the pattern of cured SLA resin. The apparatus also includes a cooler for cooling the low-viscosity non-SLA material below its freezing point until solidified.

12 Claims, 9 Drawing Sheets

SLA ADDITIVE MANUFACTURING USING FROZEN SUPPORTS OF NON-SLA MATERIAL

CROSS-REFERENCE TO RELATED APPLICATIONS

This application claims priority to and the benefit of U.S. Provisional Application No. 62/446,092, titled "SLA ADDITIVE MANUFACTURING USING FROZEN SUPPORTS OF NON-SLA MATERIAL," filed on Jan. 13, 2017, and the entirety of which is hereby incorporated by reference herein.

STATEMENT REGARDING GOVERNMENT RIGHTS

This invention was made with Government support under Contract No. CMMI1151191 awarded by the National Science Foundation (NSF). The Government has certain rights in this invention.

BACKGROUND

1. Field

This specification relates to methods and apparatus for additive manufacturing using SLA materials.

2. Description of the Related Art

Current stereolithography ("SLA") technology can print three dimensional (3D) objects with high precision and fast speed. However, for a complex computer-aided design ("CAD") model, the fabricated structures will have a significant amount of additional support structures that are required to ensure a successful and accurate printing process. Sometimes, these support structures are difficult and time consuming to remove. Even worse, the removal of these support structures may cause unexpected damage to the desired parts, resulting in unacceptable surface quality. Some special materials have been created for support structures such as water-soluble materials for Fused Deposition Modeling ("FDM") process and wax for polyjet process. For example, current FDM 3D printers can print water soluble materials as support structures based on a multi-head printing method. By using water soluble materials as support structures, the support structures can be dissolved in water after the printing process has been completed. For further example, wax material has also been used to create support structures for the 3D printing processes based on a direct inkjet print head such as the Objet series and the Polyjet series. However, for the SLA process, such support materials have not been available.

More easily removed support materials, and methods for using such materials in connection with SLA additive manufacturing, may provide advantages such as improved product quality and lower production cost. It would be desirable, therefore, to provide more effective methods and apparatuses supporting components being manufactured using SLA additive processes.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a method for SLA additive manufacturing using frozen supports of a low-viscosity non-SLA material. The method includes depositing a layer of liquid SLA resin over one of a base surface or an underlying layer of cured SLA resin. The method also includes curing a portion of the liquid SLA resin, forming a pattern of cured SLA resin. The method also includes removing uncured liquid SLA resin from the pattern of cured SLA resin, leaving one or more voids. The method also includes depositing a low-viscosity non-SLA material in the voids. The method also includes cooling the low-viscosity non-SLA material below its freezing point until solidified.

Also described is an apparatus for SLA additive manufacturing using frozen supports of a low-viscosity non-SLA material. The apparatus includes a platform for holding an assembly of SLA resin layers. The apparatus also includes a first movable stage for depositing and curing a portion of the liquid SLA resin on the platform, forming a pattern of cured SLA resin. The apparatus also includes a second movable stage for depositing a low-viscosity non-SLA material in voids in the pattern of cured SLA resin. The apparatus also includes a cooler for cooling the low-viscosity non-SLA material below its freezing point until solidified.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

In the following detailed description, numerous specific details are set forth to provide an understanding of the present disclosure. It will be apparent, however, to one of ordinary skill in the art that elements of the present disclosure may be practiced without some of these specific details. In other instances, well-known structures and techniques have not been shown in detail to avoid unnecessarily obscuring the present disclosure.

Figure 1:
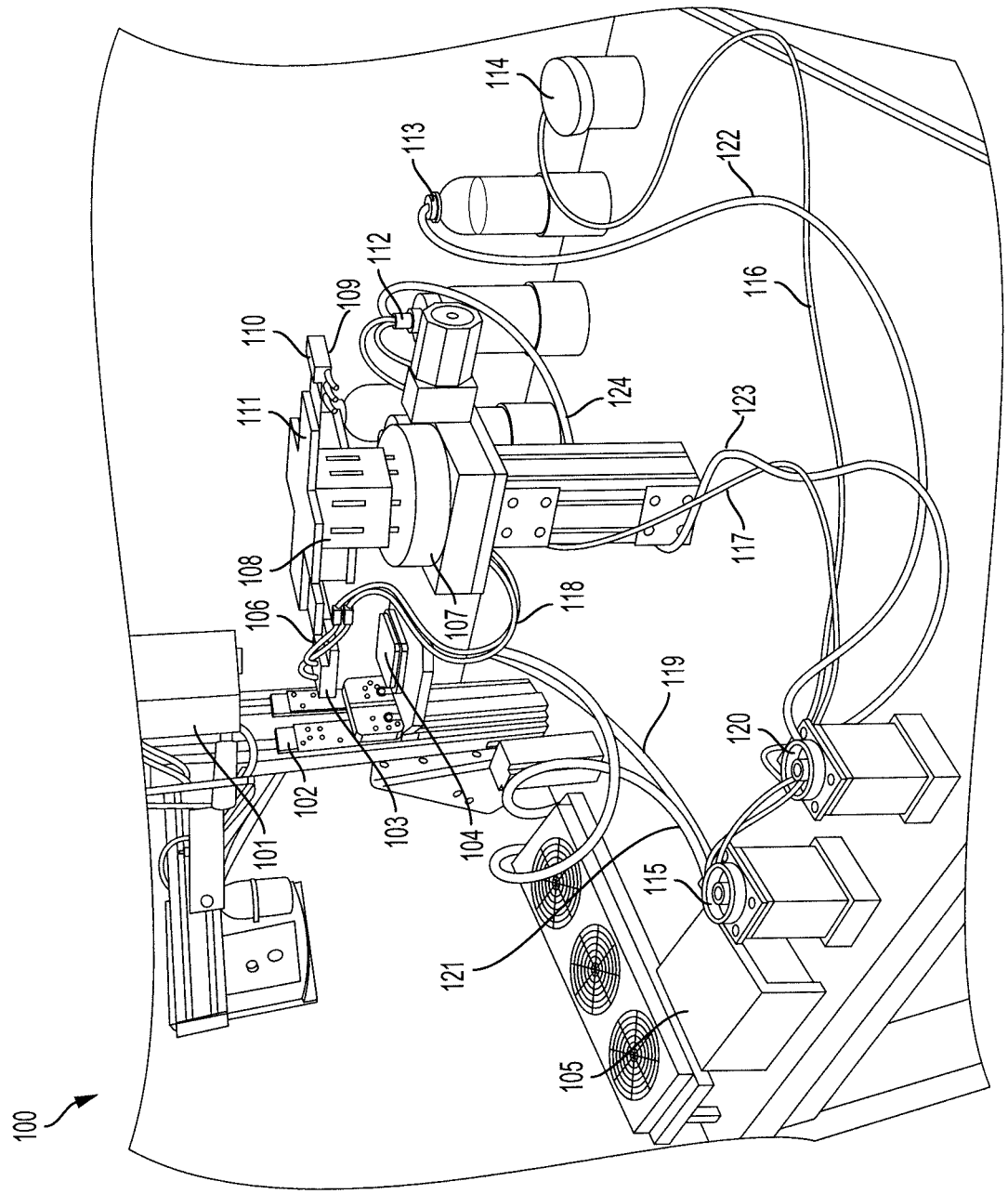
FIG. 1 is an illustration of an apparatus for SLA additive manufacturing using supports of frozen non-SLA material according to various embodiments of the invention.

FIG. 1 is an illustration of an apparatus 100 for stereolithography ("SLA") additive manufacturing using supports of frozen non-SLA material according to various embodiments of the invention. The present embodiment of apparatus 100 includes a projector 101, a linear Z-stage 102, a resin dispenser 103, a bottom thermoelectric cooler 104, a liquid cooling system 105, a residual resin vacuum 106, a rotatory stage 107, a multi-arm module 108, a top thermoelectric cooler 109, a residual water vacuum 110, a water dispenser 111, a residual liquid storage 112, a water storage 113, a resin storage 114, a resin pump 115, pipes 116-119, a water pump 120 and pipes 121-124.

The projector 101 may be fixed above the bottom thermoelectric cooler 104 so that a mask image may be projected in a direction from the projector 101 down towards the bottom thermoelectric cooler 104. The projector 101 may be configured such that the light within the bounds of the projected mask image cures the resin that may be located between the projector 101 and the bottom thermoelectric cooler 104. The projector 101 may further be configured such that little to no light is projected outside the bounds of the projected mask image, where the resin will not cure and remain substantially liquid.

The bottom thermoelectric cooler 104 may be used as a building platform for the SLA process and may be mounted on the linear Z-stage 102 so that the thermoelectric cooler 104 may move up or down in a direction towards or away from the projector 101. The pipe 119 may connect the liquid cooling system 105 to the bottom thermoelectric cooler 104. The liquid cooling system 105 may be used to efficiently remove heat from the bottom thermoelectric cooler 104. The liquid cooling system 105 may also be used to efficiently remove heat from the top thermoelectric cooler 109. The pipe 121 may connect the liquid cooling system 105 to the top thermoelectric cooler 109.

The multi-arm module 108 may be coupled to a top plate of rotatory stage 107 so that the multi-arm module 108 may rotate along with the rotatory stage 107. The multi-arm module 108 may have components coupled to and located on opposite sides of the multi-arm module 108. The multi-arm module 108 may have components coupled to and located adjacent to each other on the multi-arm module 108.

The resin dispenser 103 may be coupled to the multi-arm module 108. The resin dispenser 103 may be configured to have the resin spread out from the resin dispenser 103 via one or more apertures. The pipe 116 may connect the resin storage 114 to the resin pump 115. The pipe 117 may connect the resin pump 115 to an inlet of the resin dispenser 103. When the resin pump 115 is actuated, the resin may flow from the resin storage 114 to the resin pump 115 and then may flow from the resin pump 115 to an inlet of the resin dispenser 103. The multi-arm module 108 may rotate to bring the resin dispenser 103 into position over the bottom thermoelectric cooler 104 and actuate to deposit a layer of resin on the bottom thermoelectric cooler 104.

After the resin dispenser 103 has deposited a layer of resin on the bottom thermoelectric cooler 104, the projector 101 may be actuated and a mask image from the projector 101 may be projected onto the layer of resin on the bottom thermoelectric cooler 104. The resin that is within the boundaries of the mask image may be cured to a solid and the resin outside of the boundaries of mask image may remain substantially liquid.

The residual resin vacuum 106 may be coupled to the multi-arm module 108 and may be located adjacent to the resin dispenser 103. After the projector 101 has cured the resin within the boundaries of the mask image, the residual resin vacuum 106 may be brought into position over the bottom thermoelectric cooler 104 and actuated. Any liquid resin that is left after the curing process as described above may be extracted out from the bottom slot of the residual resin vacuum 106. The pipe 118 may connect the residual resin vacuum 106 to the residual liquid storage 112 via a controllable valve. The air pressure inside the residual liquid storage 112 can be adjusted by an air pump (not depicted). When the air pump has caused a sufficient negative pressure within the residual liquid storage 112, an actuation of a controllable valve connected to the residual resin vacuum 106 may facilitate the resin being extracted up through the residual resin vacuum through the pipe 118 into the residual liquid storage 112.

After the residual resin vacuum 106 has extracted liquid resin left over from the curing process by the projector 101, the multi-arm module 108 may rotate the resin vacuum 106 and the resin dispenser 103 away from the bottom thermoelectric cooler 104. In other embodiments, where the resin vacuum 106 and the resin dispenser 103 are not located adjacent to each other, the multi-arm module 108 may rotate only the resin vacuum 106 away from the bottom thermoelectric cooler 104.

The water dispenser 111 may be coupled to the multi-arm module 108. After the multi-arm module 108 rotates the resin vacuum 106 away from the bottom thermoelectric cooler 104, the multi-arm module 108 may rotate the water dispenser 111 into position over the previously dispensed and cured resin layer. The water dispenser 111 may be configured to have water spread out from the water dispenser 111 via one or more apertures. The water dispenser 111 may, in some embodiments, dispense water through a syringe. The pipe 122 may connect the water storage 113 to the water pump 120. The pipe 123 may connect the water pump 120 to an inlet of the water dispenser 111. When the water pump 120 is actuated, water may flow from the water storage 113 to the water pump 120 and from the water pump 120 to an inlet of the water dispenser 111. The water dispenser 111 may be coupled to the top thermoelectric cooler 109 such that while the water dispenser 111 is dispensing water over the bottom thermoelectric cooler 104, the top thermoelectric cooler 109 may also be above the bottom thermoelectric cooler 104. During the process of dispensing water, the dispensed water may fill a gap between the top thermoelectric cooler 109 and the bottom thermoelectric cooler 104. The water in the gap may turn into a layer of ice while the top thermoelectric cooler 109 is above the bottom thermoelectric cooler 104. During the water dispensing process, some droplets of water may form irregularities in the layer of deposited ice. The irregularities may be in the form of residual ice droplets or a residual partial thin layer of ice.

The residual water vacuum 110 may be mounted on the multi-arm module 108 and may be located adjacent to the water dispenser 111. The residual water vacuum 110 may be configured to heat the residual ice droplets or residual partial thin layer of ice into residual molten ice. The residual water vacuum 110 may also configured to extract any residual molten ice that is left on the top surface of the layer of ice via a bottom slot of the residual water vacuum 110. After the water dispensed has subsequently frozen, the residual water vacuum 110 may be brought into position over the bottom thermoelectric cooler 104 and actuated. Any residual ice droplets or residual partial thin layer of ice may be removed by the residual water vacuum 110. The pipe 124 may connect the residual water vacuum 110 to the residual liquid storage 112. As previously stated, the air pressure inside the residual liquid storage 112 may be adjusted by an air pump (not depicted). When the air pump has sufficiently caused a negative pressure within the residual liquid storage 112, an actuation of a controllable water valve connected to the residual water vacuum 110 may facilitate water being extracted up through the residual water vacuum 110 through the pipe 124 and into the residual liquid storage 112.

Figure 2A:
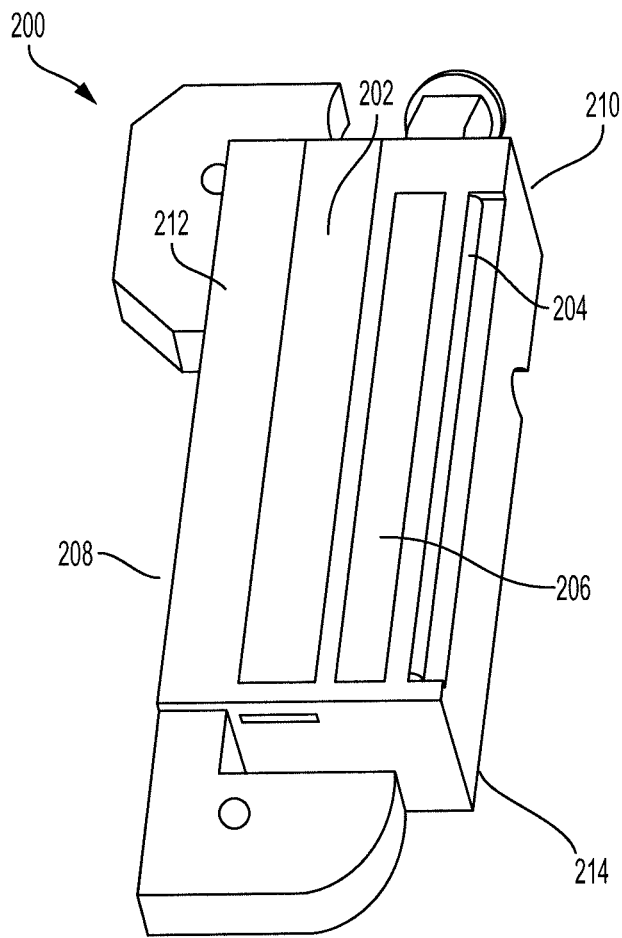
FIGS. 2A-2B are illustrations of a residual water vacuum for removing excess frozen non-SLA material from one or more layers of cured SLA resin according to various embodiments of the invention.

FIG. 2A is an illustration of the residual water vacuum 200 for removing excess frozen non-SLA material from one or more layers of cured SLA resin according to an embodiment of the invention. The residual water vacuum 200 may be similar to the residual water vacuum 110 of FIG. 1. The residual water vacuum 200 may have a front end 208, a back end 210, a top surface 214, and a bottom surface 212.

A thermal heater 202 may be coupled to bottom surface 212 towards front end 208 of residual water vacuum 200 and may be used to heat the residual ice droplets or a residual partial thin layer of ice. During operation, at least some of the residual ice droplets or thin layer of ice is converted to residual molten ice as a result of the heating from the thermal heater 202. The residual molten ice may then be more easily extracted out via the vacuum slot 206 located on bottom surface 212 of residual water vacuum 200. A temperature sensor, not depicted, can also be incorporated into the structure of residual water vacuum 200 to make a closed-loop control of the heating temperature. In one embodiment, the heater temperature could be set to 40 degrees centigrade. However, this embodiment is not exclusive, as different heater temperatures for water or other suitable non-SLA materials may be used.

During operation, the vacuum slot 206 may not extract all of the residual molten ice converted by the heater 202. The rubber blade 204 may be coupled to the bottom surface 212 towards the back end 210 of the residual water vacuum 200. The rubber blade 204 may be configured to partially extend out from the bottom surface 212 of the residual water vacuum 200 so that the rubber blade 204 may wipe away at least some of the residual molten ice that is missed by the vacuum slot 206 ahead of it. In one embodiment, the rubber blade 204 can extend 0.5 mm away from the bottom surface 212 of the residual water vacuum 200. However, this embodiment is not exclusive as different extension lengths may be employed.

Figure 2B:
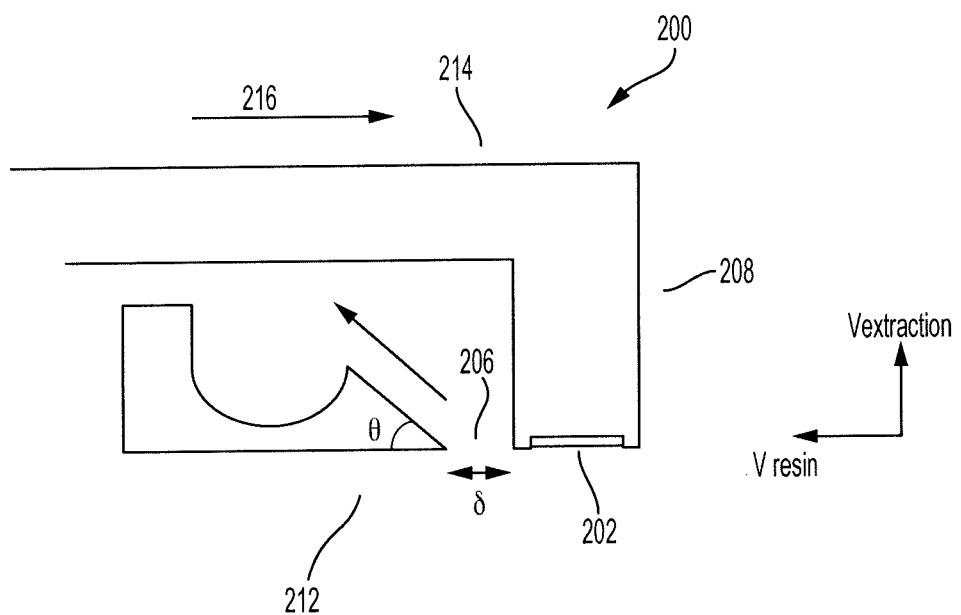

FIG. 2B is a side cutaway view of the residual water vacuum 200 depicted in FIG. 2A. The residual water vacuum 200 may move in a forward direction with a predetermined vacuum velocity 216, with the front surface 208 at the front of the residual water vacuum 200. The vacuum velocity 216 may be chosen from a set of parameters, including but not limited to, production speeds, SLA material properties, non-SLA material properties and the time it takes for heat transfer to occur between the heater and the residual molten ice. In one embodiment, the optimum value for the vacuum velocity 216 is chosen by balancing the maximum heat transferring time and the minimum building time. In one embodiment, the vacuum velocity 216 may be 15 mm/s. The vacuum slot 206 may have an aperture to facilitate entry of the residual molten ice into the residual water vacuum 200. The width of the aperture is represented by δ in FIG. 2B. The width of the aperture may be adjusted or chosen to optimize the extraction force of the vacuum slot 206. In one embodiment, the width of the aperture may be set to 0.2 mm. However, this embodiment is not exclusive, as different aperture widths can be used. The vacuum 200 may have an extraction velocity where the extraction velocity represents the speed of the air flow entering the vacuum slot 206. The extraction velocity may be determined based on parameters of an air pump and an aperture width. The air pump, not shown in the figures, may create conditions such that air enters the vacuum slot 206 at the extraction velocity. The air pump may be mounted inside the residual water vacuum 200, on the exterior of the residual water vacuum 200, or located outside the residual water vacuum 200. The slot angle, represented by θ, can be constrained by the equation $\theta \leq \tan^{-1}(V^{extraction}/V_{vacuum})$.

The residual molten ice that is extracted up into the residual water vacuum 206 may be sent through a tube to an external reservoir. This tube can be made from a polymer material, a metal material, a ceramic material, or any other material capable of receiving and transmitting fluids. In one embodiment, the external reservoir may be the same reservoir used for the SLA resin waste.

Figure 3A:
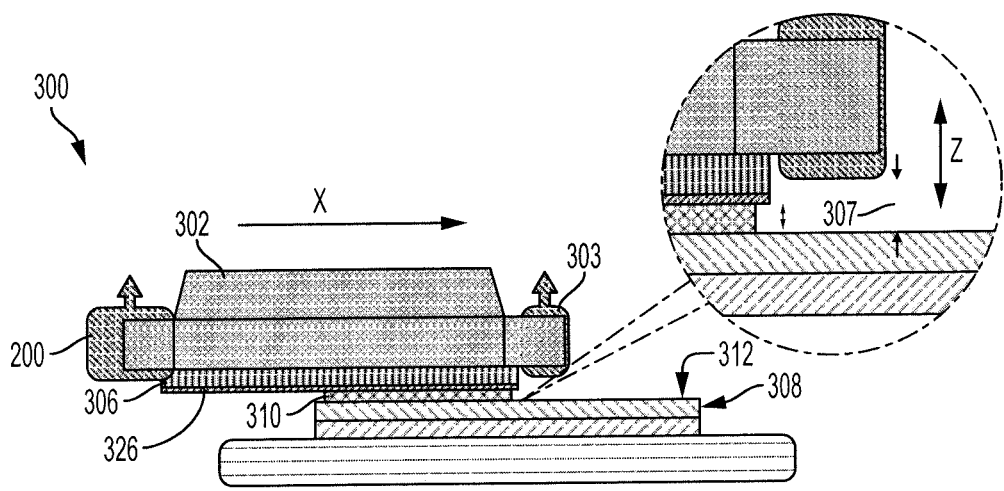
FIGS. 3A-3G are illustrations of operation for a method for SLA additive manufacturing using supports of frozen non-SLA material according to various embodiments of the invention.

FIG. 3A is an illustration of an operation for a method for SLA additive manufacturing using supports of frozen non-SLA material according to various embodiments of the invention. The ice tool 302 may be similar to a combination of the water dispenser 111, the residual water vacuum 110 and the top thermoelectric cooler 109 from FIG. 1. The ice tool 302 moves in a direction X as depicted in FIG. 3A. The movement in the direction X may be powered by a motor attached to the ice tool 302. The water dispenser 303 is mounted to the front end of the ice tool 302. The ice tool 302 moves across a surface 312 of the bottom thermoelectric cooler 308 where the water dispenser 303 is in the front of such movement. The ice tool 302 may, in one embodiment, have the top thermoelectric cooler 306 coupled to the bottom of ice tool 302. At the rear end of the ice tool 302 is the residual water vacuum 200. As the ice tool 302 moves across the surface 312, there may be a gap 307 between the top thermoelectric cooler 306 and the bottom thermoelectric cooler 308. In one embodiment, the ice tool 302 may be moved in the Z direction to adjust the gap 307 between the top thermoelectric cooler 306 and the bottom thermoelectric cooler 308. In another embodiment, the bottom thermoelectric cooler 308 may be adjusted in the Z direction to adjust the gap 307 between the top thermoelectric cooler 306 and the bottom thermoelectric cooler 308.

As the ice tool 302 moves over the surface 312 of the bottom thermoelectric cooler 308, the water dispenser 303 may dispense liquid water onto the surface 312. The liquid water may originate from an outside reservoir and may be pumped in by a water pump through a tube to the water dispenser 303, as shown in FIG. 1. As the water is dispensed onto the surface 312 of the bottom thermoelectric cooler 308, the water forms a water layer 310 of the gap 307 between the top thermoelectric cooler 306 and the bottom thermoelectric cooler 308. Due to the surface tension of water, the water now including the water layer 310 is constrained to gap 307 between the top thermoelectric cooler 306 and the bottom thermoelectric cooler 308. In one embodiment, the surface of the top thermoelectric cooler 306 has a low friction coating 326 applied to it. The low friction coating 326 may be chosen from a set of coatings that allows a decrease in the surface friction such that the top thermoelectric cooler 306 is easily removed from the ice forming between the top thermoelectric cooler 306 and the bottom thermoelectric cooler 308.

In some embodiments, the water layer 310 is initially dispensed onto the bottom thermoelectric cooler 308 to create a first layer of ice. In other embodiments, however, a layer of resin may be dispensed initially onto the bottom thermoelectric cooler 308 to create a first layer of resin. A first layer of ice serves to provide an easier separation of the part after the building process has finished from the bottom thermoelectric cooler 308. Removal may be accomplished by melting the first layer of ice on the bottom thermoelectric cooler 308 and removing the part from the bottom thermoelectric cooler 308.

Figure 3B:
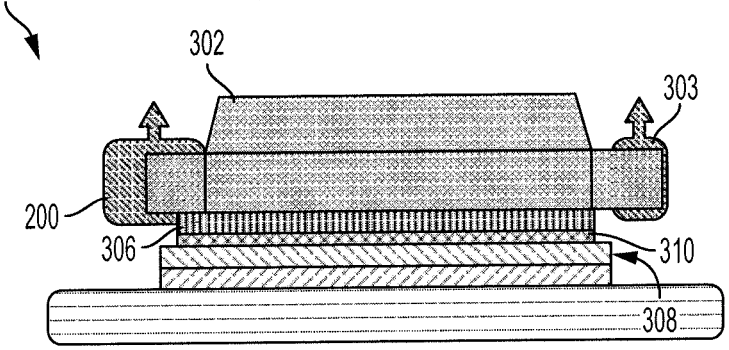

FIG. 3B illustrates the ice tool 302 of FIG. 3A after the ice tool 302 has moved forward in the manufacturing process. At this stage, both the top thermoelectric cooler 306 and the bottom thermoelectric cooler 308 has caused the water in the gap 307, the water layer 310, to have substantially turned into ice.

As the ice tool 302 moves across the surface 312 there may be residual ice droplets or a residual partial thin layer of ice left over from the process. As discussed earlier in relation to FIGS. 2A-2B, the residual water vacuum 200 may partially melt and extract at least some residual ice droplets or a residual partial thin layer of ice left over from process steps embodied in FIGS. 3A-3B.

After the ice tool 302 has moved across the surface 312, the ice tool 302 is removed from the surface 312 and the resin tool 304 is brought into position over the ice layer as discussed in FIG. 1. This may be accomplished by using a multi-arm module 108 as shown in FIG. 1 or may be accomplished using some other type of device or apparatus.

Figure 3C:
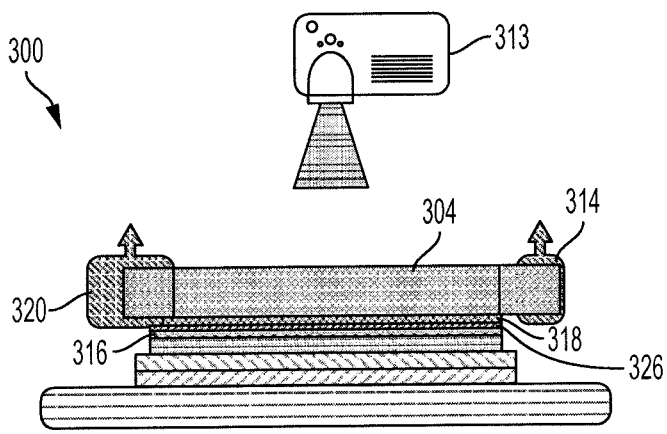

FIG. 3C illustrates the resin tool 304 with the resin dispenser 314 mounted at the front of the tool similar to the arrangement of the ice tool 302 in FIGS. 3A and 3B. The resin tool 304 moves in a direction X as depicted previously in FIG. 3A. The movement in the direction X may be from an attached motor to the resin tool 304. The resin tool 304 may have transparent glass 318 coupled to the bottom of the resin tool 304 and configured such that the transparent glass 318 is at least in partial contact with the dispensed resin from the resin dispenser 314. In another embodiment, the transparent glass 318 may have the low friction coating 326 applied to it. In one embodiment, the resin tool 304 moves across the surface of the previously deposited water layer 310, now a layer of ice, where the resin dispenser 314 is at the front of such movement. At the rear end of the resin tool 304 is the residual resin vacuum 320. As the resin tool 304 moves across the surface there may be a gap 307 between the transparent glass 318 and the previously deposited water layer 310. In one embodiment, the resin tool 304 may be adjusted in the Z direction, as depicted in FIG. 3A, so as to adjust the gap 307 between the transparent glass 318 and the previously deposited water layer 310.

As the resin tool 304 moves over the surface of previously deposited water layer 310, the resin dispenser 314 dispenses liquid resin onto the surface. In one embodiment, the liquid resin originates from an outside reservoir and is pumped in by a resin pump through a tube to the resin dispenser 314. As the resin is dispensed onto the surface of the water layer 310, the resin forms a resin layer 316 between the transparent glass 318 and the water layer 310. In one embodiment, the low friction coating 326 coats the transparent glass 318 allowing a decrease in the surface friction between the transparent glass 318 and the deposited resin. The low friction coating 326 on the transparent glass 318 may be the same low friction coating 326 applied to the top thermoelectric cooler 306. After the resin layer 316 is deposited on the surface of the water layer 310, a pattern image may be projected on the resin surface through the transparent glass 318 by the projector 313. The projector 313 may be located external and separate from the resin tool 304 or may be or as an integral part to the resin tool 304. The projected pattern image may be projected for a predetermined amount of time. The predetermined amount of time may be based in part on the curing properties of the resin. In one embodiment the predetermined amount of time may be 20 seconds or in the range of 15 seconds to 25 seconds.

Figure 3D:
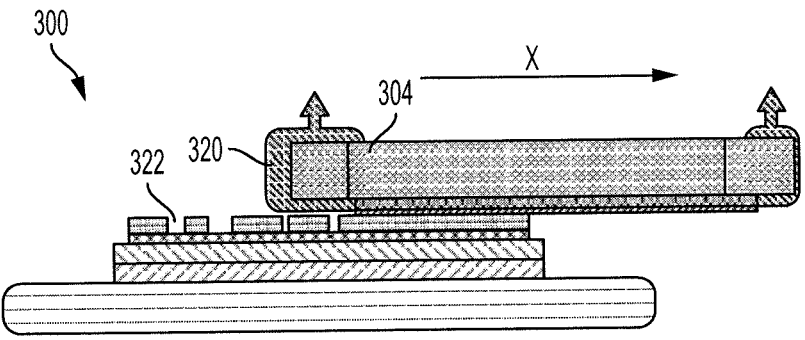

FIG. 3D illustrates the resin tool of FIG. 3C after it has moved forward in the process. During movement of the resin tool 304, the residual resin vacuum 320 may be actuated to extract all the unsolidified residual liquid resin left over from the process of FIG. 3C and leaving only a single layer of solidified resin pattern. The residual resin vacuum 320 may operate substantially similarly to previously described residual water vacuum 200, except there is no heater coupled to it.

Figure 3E:
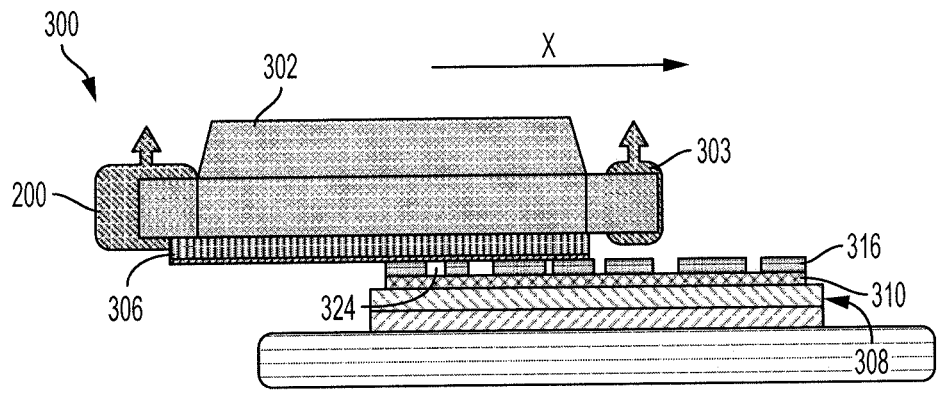
Figure 3F:
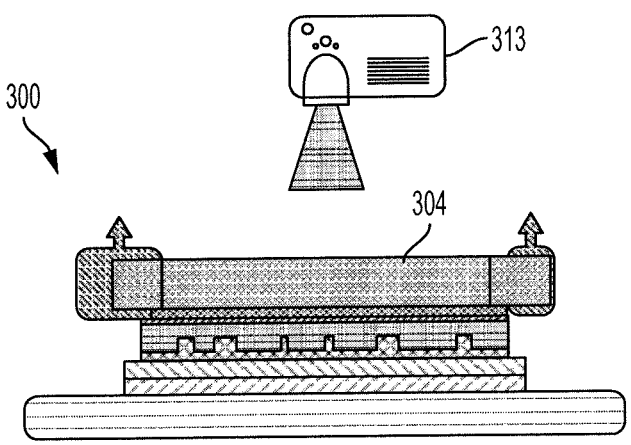

FIGS. 3E and 3F illustrate a repetition of the steps disclosed in relation to FIGS. 3C-3D. The processes of FIGS. 3C-3D may be repeated many times to build up several layers of cured resin, if the resin patterns in these layers do not need individual support.

Figure 3G:
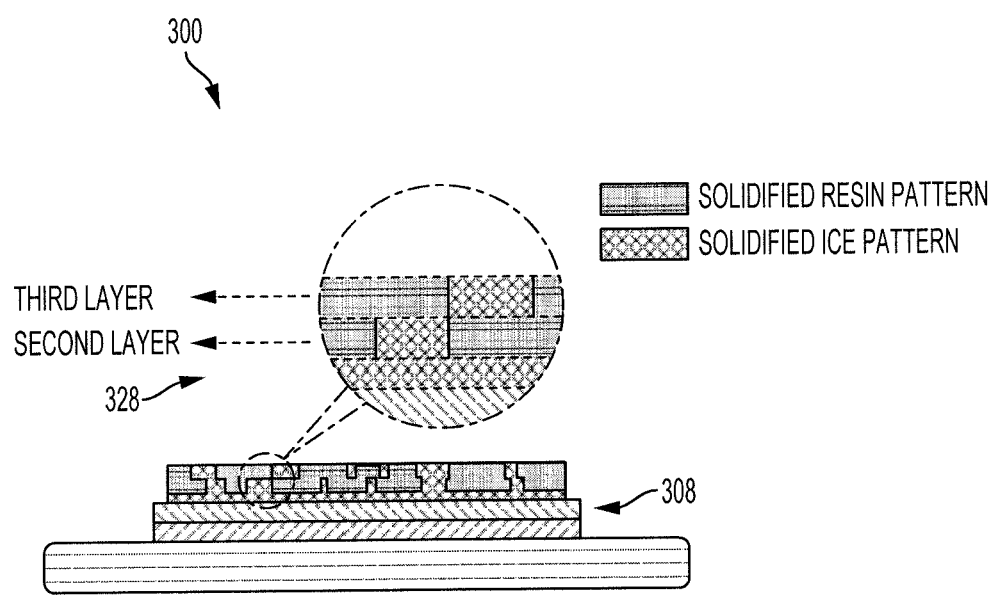

Once support is needed, as shown in FIG. 3E, the ice tool 302 moves across the surface of the deposited and cured resin layer 316. The ice tool 302 spreads water to fill the voids 324 in the previous cured resin layer 316 and freeze the water in the voids 324. Consequently, a larger layer that includes both the cured resin layer 316 and now solidified ice in the voids 324 is formed. The resin tool 304 is then used to spread and cure the next resin layer, as depicted in FIG. 3F. By repeating the processes from FIG. 3C to FIG. 3F, a pattern layer 328 results, as depicted in FIG. 3G.

Figure 4A:
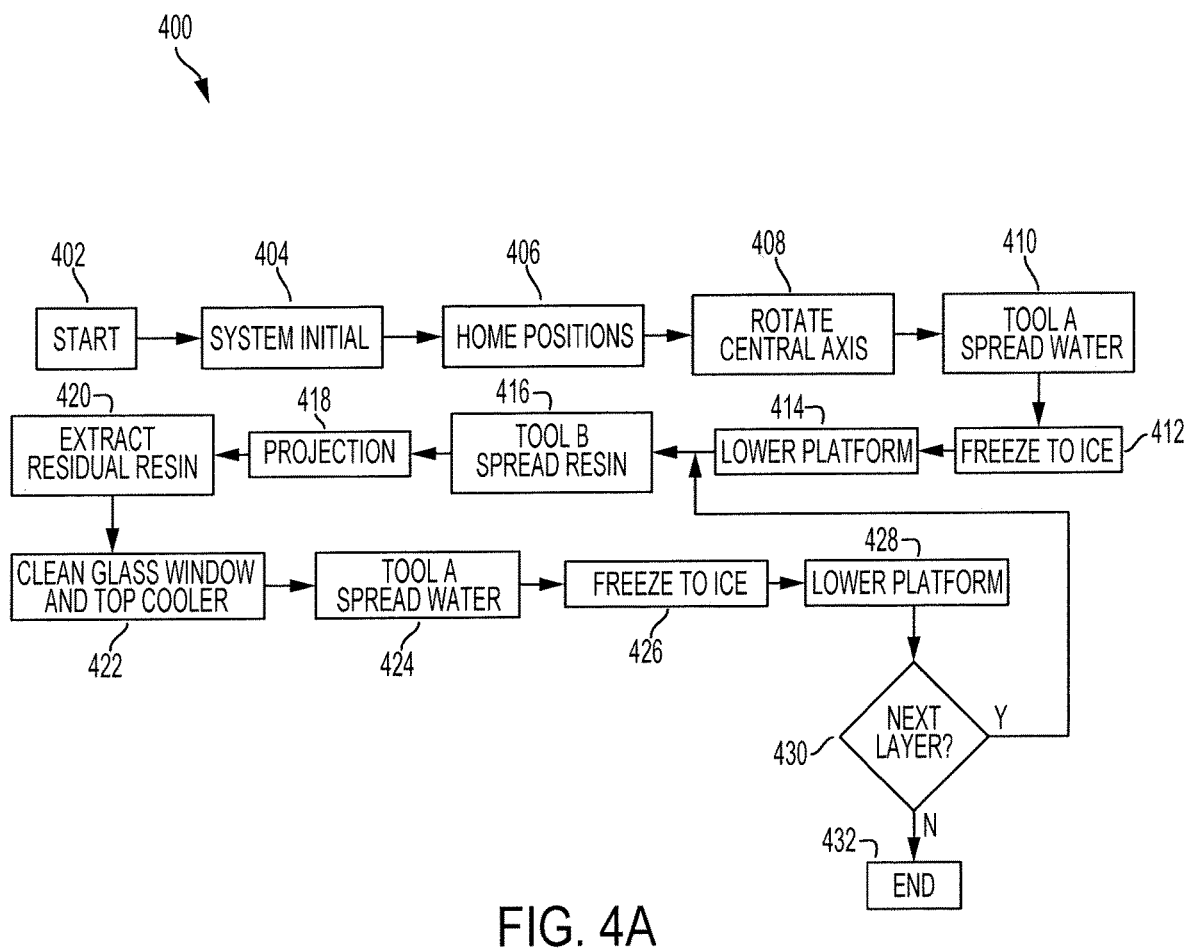
FIGS. 4A-4B are flowcharts for methods for SLA additive manufacturing using supports of frozen non-SLA material according to various embodiments of the invention.

FIG. 4A illustrates a flowchart for a method 400 for SLA additive manufacturing using supports of frozen non-SLA material in accordance with the embodiment depicted in FIG. 1. The method 400 may include, a start stage where the process flow beings (Step 402). A system initial stage where the relevant components are initialized, actuated, turned on, or otherwise prepared for the method to begin (Step 404).

A home positions stage where the relevant moveable components of the apparatus 100 is brought to a home position in order to accurately set up beginning conditions for the process flow to begin (Step 406). This stage may involve the rotatory stage 107 rotating the multi-arm module 108 into a preset home position. This stage may also involve linear Z-stage moving up or down relative to the projector 101 into a preset home position.

A rotate of central axis stage where the rotatory stage 107 rotates to bring the ice tool 302 into position over the bottom thermoelectric cooler 104 to lay down the initial water layer (Step 408). In one embodiment, the ice tool 302 and the resin tool 304 are coupled to opposite sides of the multi-arm module 108 such that when the rotatory stage 107 rotates the ice tool 302 into position, the rotatory stage 107 brings the resin tool 304 out of position over the bottom thermoelectric cooler 104.

A spread water stage where tool A is the ice tool 302 and the water is spread out on the bottom thermoelectric cooler 104 to lay down the initial water layer (Step 410). The water may be spread out via one or more apertures on the water dispenser 111. The water may also be spread out via a syringe.

A freeze to ice stage where the deposited water between the top thermoelectric cooler 109 located on the bottom portion of the ice tool 302 and the bottom thermoelectric cooler 104 begins to turn to solid ice (Step 412). The top thermoelectric cooler 109 may be coupled to or an integral part of the ice tool 302. In one embodiment, the freeze to ice stage may be a part of the spread to water stage such that the water between the top thermoelectric cooler 109 and the bottom thermoelectric cooler 104 starts to turn to ice while the spread water stage is still in effect.

A lower platform stage where the bottom thermoelectric cooler 104 is lowered from its previous position by the linear Z-stage 102 in preparation for the resin tool 304 to be brought into position over the bottom thermoelectric cooler 104 (Step 414). The linear Z-stage 102 may be lowered to its original home position or to some other position above or below the original home position.

A tool B spread resin stage where tool B is the resin tool 304 and resin is spread out on top of the previously applied layer of ice on the bottom thermoelectric cooler 104 (Step 416). The resin may be spread out by one or more apertures on the resin dispenser 103.

A projection stage where a pattern is projected onto the liquid resin from a projector 101 so as to solidify resin within the projected pattern and leave liquid the resin outside of the projected pattern (Step 418). The resin tool 304 may be configured so as to have the projection radiate through the resin 304 via the transparent glass 318 as depicted in FIG. 3C.

An extract residual resin stage where the residual resin vacuum 106 attached to the resin tool 304 moves across the previous applied layer of the resin and extracts substantially all of the non-solidified resin (Step 420). The residual resin vacuum 106 may be substantially similar to the residual water vacuum 110 except the residual resin vacuum 106 does not have a heater.

A clean glass window and top cooler stage where any residual resin on the transparent glass 318 and any residual water on the top thermoelectric cooler 109 are removed during a separate process or by a separate tool (Step 422). A low friction coating 326 applied to the transparent glass 318 and the top thermoelectric cooler 109 may substantially prevent residual liquids from sticking to the transparent glass 318 and the top thermoelectric cooler 109 and may be considered to either circumvent or fulfill the clean glass window and top cooler in Step 422.

A tool A spread water stage where the stage 410 is repeated in order to create supporting structures for previously deposited or future deposited resin (Step 424). A freeze to ice stage where the stage 412 is likewise repeated (Step 426). A lower platform stage where the stage 414 is likewise repeated (Step 428).

Method 400 may include a next layer decision tree where a decision must be made (Step 430). Either an additional layer is not sought and the process goes to Step 432 and ends or a next layer of resin to be applied is desired and the system goes to Step 416 in the process and the process proceeds through the step 416-430 again.

Figure 4B:
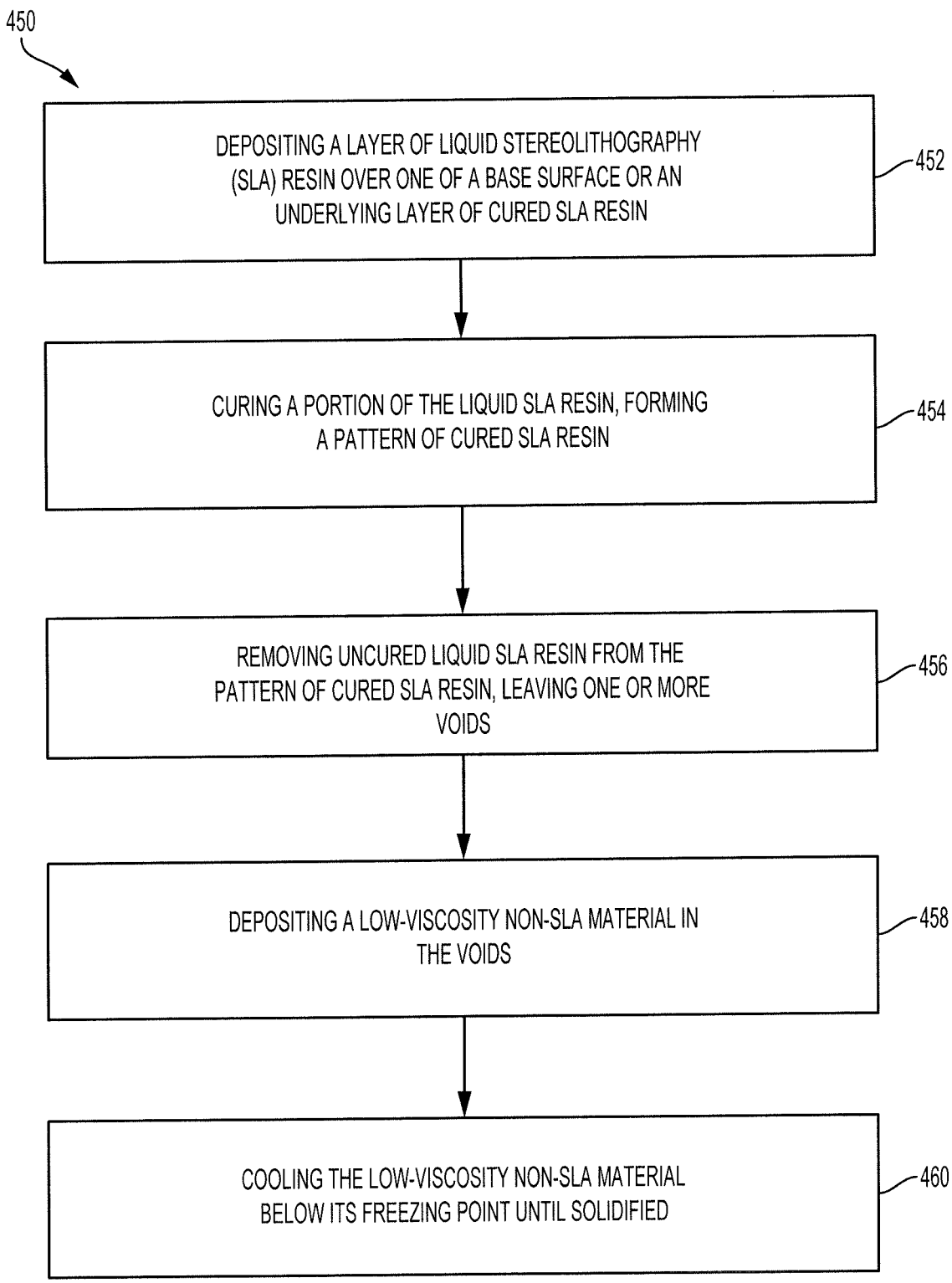

FIG. 4B illustrates a more generalized method 450 for SLA additive manufacturing using frozen supports of a low-viscosity non-SLA material, consistent with method 400.

Method 450 may include depositing a layer of liquid SLA resin over one of a base surface or an underlying layer of cured SLA resin (Step 452), similar to the process disclosed in reference to FIG. 3C. The resin dispenser 314 may deposit liquid SLA resin via one or more apertures. The base surface may be the bottom thermoelectric cooler 306, a previously deposited layer of ice, or any other surface type that can be configured to receive a layer of resin from the resin dispenser 314.

Method 450 may further include curing a portion of the liquid SLA resin, forming a pattern of cured SLA resin (Step 454). Curing may be a result from the projector 313 projecting a mask image onto the liquid SLA resin deposited during Step 452. The resin tool 304 may be configured to have the projector 313 project the mask image through the resin tool 304 and onto the liquid SLA resin. The projector 313 may be configured to project the mask image onto the liquid SLA resin after the resin tool 304 or the resin dispenser 314 has been removed from the surface.

Method 450 may include removing uncured liquid SLA resin from the pattern of cured SLA resin, leaving one or more voids (Step 456). Removing uncured liquid SLA may be accomplished by the residual resin vacuum 320. Removing uncured liquid SLA may be a separate process from forming a pattern of cured SLA resin in Step 454. In one embodiment, removing uncured liquid SLA may be part of an integrated step where removing uncured liquid SLA resin and curing liquid SLA resin is part of a single step process.

Method 450 may include depositing a low-viscosity non-SLA material in voids (Step 458), similar to the process in FIG. 3E. Voids may be areas where liquid SLA resin has been removed previously during Step 456. In one embodiment, depositing the low-viscosity non-SLA material may be accomplished by the water dispenser 303. In another embodiment, depositing the low-viscosity non-SLA material may be accomplished by a fluid dispenser configured to dispense a fluid other than water.

Method 450 may include cooling the low-viscosity non-SLA material below its freezing point until solidified (Step 460). In one embodiment, cooling the non-SLA material may include energizing a thermoelectric material that is thermally coupled to the low-viscosity non-SLA material that is deposited in the voids. In another embodiment, cooling the non-SLA material may be the result of the material being between two thermoelectric coolers, similar to the process in FIG. 3B.

Method 450 may further include repeating the depositing the layer of liquid SLA resin, the curing, the removing, the depositing the low-viscosity non-SLA material, and the cooling to form a multi-layer structure of cured SLA resin and frozen low-viscosity non-SLA material. In an aspect of the method, multiple layers of the liquid SLA resin may be deposited and cured between successive operations of depositing and curing the low-viscosity non-SLA material, in cases where support is not needed for every layer. Method 450 may further include warming the multi-layer structure of cured SLA resin and frozen low-viscosity non-SLA material until the frozen low-viscosity non-SLA material entirely melts, and removing the melted low-viscosity non-SLA material, leaving a multi-layer structure substantially including cured SLA resin.

In an embodiment of method 450 the low-viscosity non-SLA material comprises water, for example, pure water or a solution of some other material or material (e.g., salts or alcohols) in water. For most aqueous support materials, the low-viscosity non-SLA material expands upon freezing, creating an excess of frozen non-SLA material. Accordingly, in an aspect, the method 450 may further include removing the excess of frozen non-SLA material. In an aspect, removing the excess may include passing an extractor (e.g., the residual water vacuum shown in FIGS. 2A-2B) over the pattern of cured SLA resin. In such case, method 450 may include preceding the extractor with a heater.

In another embodiment, method 450 may include enclosing a perimeter of the pattern of cured SLA resin, a bounding wall, to prevent runoff of the low-viscosity non-SLA material. Bounding wall may include curing a perimeter wall pattern in the layer of liquid SLA resin, for example, using a projector or laser.

Figure 5A:
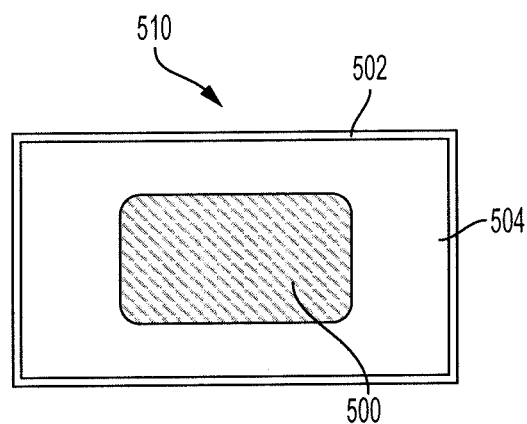
FIGS. 5A-5D are illustrations of a bounding wall for enhancing a method for SLA additive manufacturing using supports of frozen non-SLA material according to various embodiments of the invention.
Figure 5B:
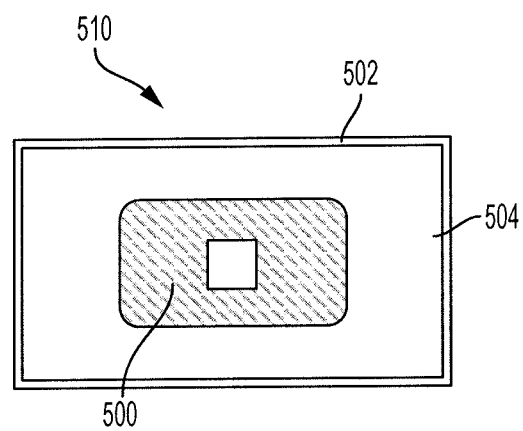

FIG. 5A illustrates a bottom view of an assembly 510 for enhancing a method for SLA additive manufacturing using supports of frozen non-SLA material. An outer bounding wall 502 at least partially surrounds an inner area of the solidified ice 504. The inner area of the solidified ice 504 at least partially surrounds the final part 500 at the very center of assembly 510. FIG. 5B illustrates a top view of assembly 510.

The bounding wall 502 may be deposited in layers of resin by the resin dispenser 314 every time a layer of resin is deposited for the final part 500. The layers of the bounding wall 502 may be deposited without a corresponding layer of resin for the final part 500. The solidified ice 504 may be deposited in layers of ice by the water dispenser 303 every time a layer of water is deposited as support structures for the final part 500. The solidified ice 504 may be deposited in layers of ice by the water dispenser 303 every time a layer of resin is deposited for the bounding wall 502 or for the final part 500.

Figure 5C:
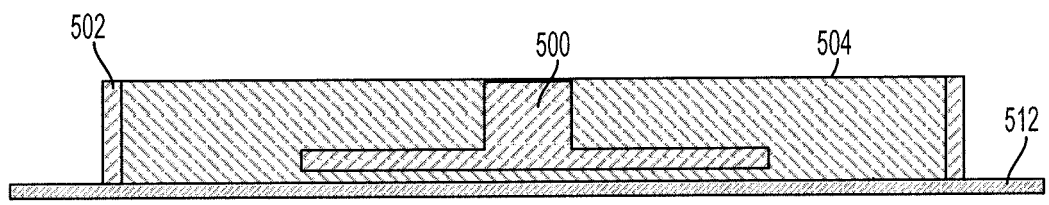
Figure 5D:
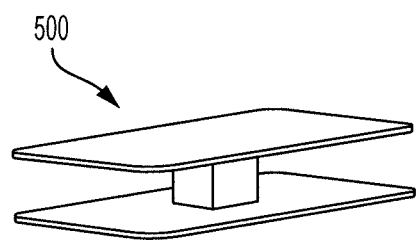

FIG. 5C illustrates a side cross sectional view of the bounding wall 502 discussed in reference to FIGS. 5A and 5B. The structure 500 rests on the building platform 512. The bounding wall 502 at least partially surrounds the inner solidified ice 504. The inner solidified ice 504 at least partially surrounds the final building part 500. By constraining the deposited water, which later solidifies into the inner solidified ice 504, the water does not spread towards and outside the boundary of the building platform 512. In one embodiment, the bounding wall 502 is deposited in layers so as to grow in height as multiple layers are deposited for the final part 500 so as to be substantially the same height as the final part 500. By utilizing the bounding wall 502 the height of the solidified ice 504 may be substantially the same as the height of the building part 500. Without the bounding wall 502, the height of the solidified ice 504 may taper down from the surrounding area of the final part 500 towards the edges of the building platform 512. This tapering effect may limit the maximum height of the final part 500 without the bounding wall 502. FIG. 5D illustrates final part 500 built according to an embodiment of the present invention.

Alternative embodiments of the described apparatus and methods may include other arrangements of tools such that the motion of the vacuums and dispensers is not limited to rotation. For example, the motion can also be linear movement. In another aspect, the methods are not limited to spreading water or other non-SLA support fluid in each layer. Instead, the methods may spread the support fluid every several layers. In another aspect, the multi-arm module design as shown in FIG. 1 is not limited to print a certain type of resin material. The apparatus can also provide multi-material printing by adding extra arm modules to the depicted system. In another aspect, the projection system is not limited to the top-down method. The bottom-up projection, or other controlled light emission can also be used by changing some components in the hardware system. In another embodiment, the non-SLA support structure material in this process is not limited to the water. The water is a representative one, but other liquid materials which have a close physical property with water may also be suitable, for example, butter, fat or high-freezing point alcohols.

Having thus described embodiments of methods and apparatus for SLA additive manufacturing using supports of frozen non-SLA material, it should also be appreciated that various modifications, adaptations, and alternative embodiments thereof may be made within the scope and spirit of the present invention. For example, the use of water as a support material is described, but the inventive concepts described above may be equally applicable to other freezable non-SLA support materials than disclosed herein above. In addition, while digital projection is described for curing SLA resin, it should be appreciated that other methods for providing a pattern of light may also be suitable for curing a pattern of SLA resin.

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A method for stereolithography (SLA) additive manufacturing, the method comprising:
    depositing a layer of liquid SLA resin over one of a base surface or an underlying layer of cured SLA resin;
    curing a portion of the liquid SLA resin to form a pattern of cured SLA resin;
    removing uncured liquid SLA resin from the pattern of cured SLA resin to leave one or more voids;
    depositing water into the one or more voids; and
    cooling the water below its freezing point until the water solidifies.

2. The method of claim 1, further comprising repeating the depositing the layer of liquid SLA resin, the curing, the removing, the depositing the water, and cooling the water to form a multi-layer structure of cured SLA resin and frozen water.

3. The method of claim 2, wherein multiple layers of the liquid SLA resin are deposited and cured between successive operations of depositing and cooling the water.

4. The method of claim 2, further comprising warming the multi-layer structure of cured SLA resin and frozen water until the frozen water entirely melts.

5. The method of claim 4, further comprising removing the melted water, leaving a multi-layer structure substantially including cured SLA resin.

6. The method of claim 5, wherein the water expands upon freezing, creating an excess of frozen water.

7. The method of claim 6, further comprising removing the excess of frozen water.

8. The method of claim 6, wherein removing the excess comprise extractor over the pattern of cured SLA resin.

9. The method of claim 7, further comprising preceding the extractor with a heater.

10. The method of claim 1, further comprising enclosing a perimeter of the pattern of cured SLA resin to prevent runoff of the water.

11. The method of claim 9, wherein enclosing the perimeter comprises curing a perimeter wall pattern in the layer of liquid SLA resin.

12. The method of claim 1, wherein cooling the water comprises energizing a thermoelectric material that is thermally coupled to the water that is deposited in the one or more voids.

* * * * *